March 27, 1934.   A. H. DALL ET AL   1,952,423
GRINDING MACHINE
Filed June 7, 1932   3 Sheets-Sheet 2

Inventor
ALBERT H. DALL
HANS ERNST

A. H. Parsons
Attorney

March 27, 1934.  A. H. DALL ET AL  1,952,423
GRINDING MACHINE
Filed June 7, 1932  3 Sheets-Sheet 3
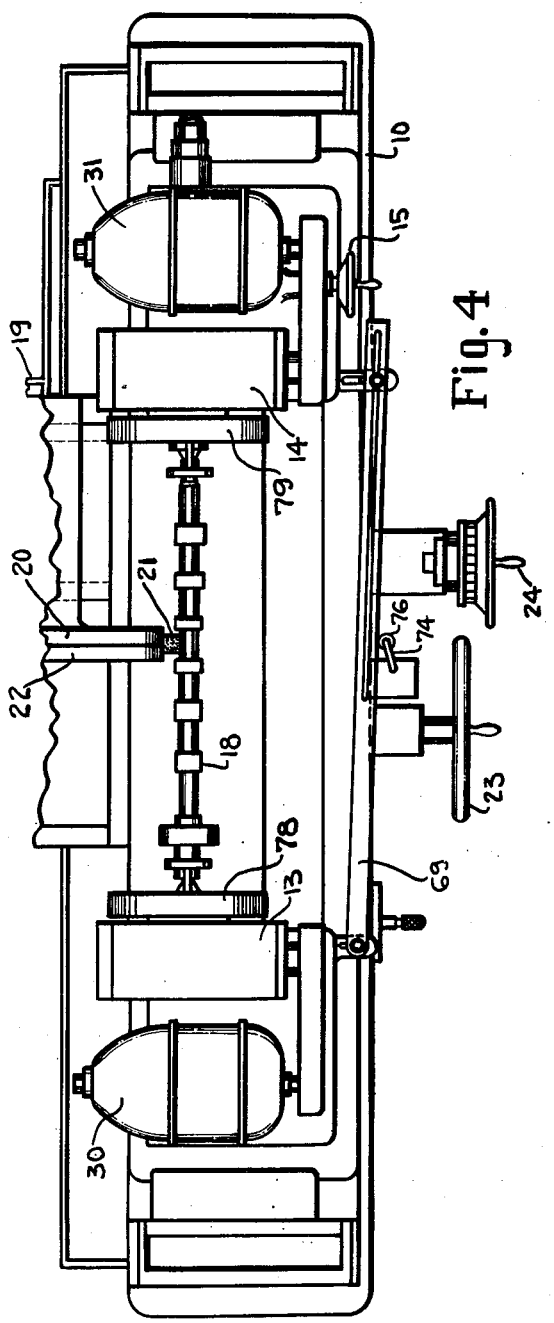
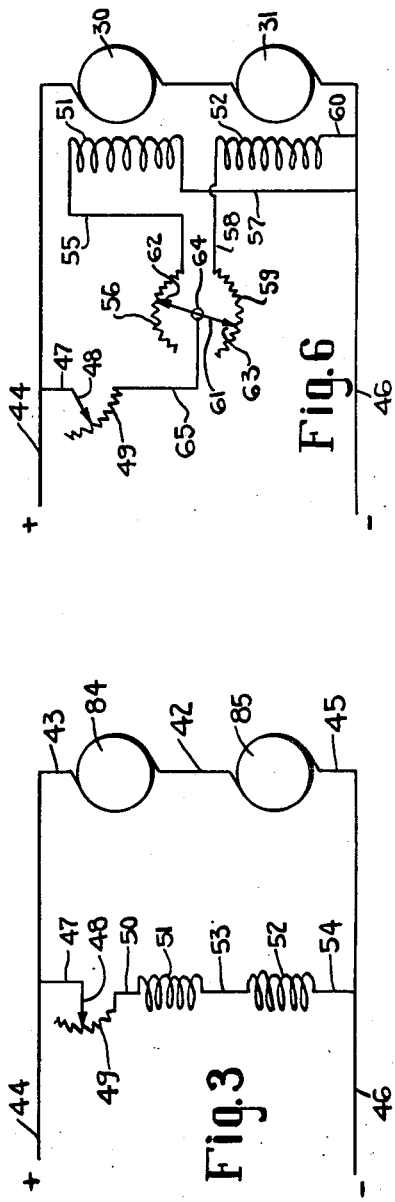
Inventor
ALBERT H. DALL
HANS ERNST
By A. K. Parsons
Attorney Patented Mar. 27, 1934

1,952,423

UNITED STATES PATENT OFFICE 1,952,423

GRINDING MACHINE

Albert H. Dall and Hans Ernst, Cincinnati, Ohio, assignors to Cincinnati Grinders Incorporated, Cincinnati, Ohio, a corporation of Ohio Application June 7, 1932, Serial No. 615,890

9 Claims. (Cl. 51—237)

This invention relates to improvements in machine tools and especially to a work piece driving mechanism for use with machine tools.

One of the principal objects of the present invention is the provision of improved means for rotating work pieces to insure the rotation thereof about a definite axis and to reduce to a minimum the torsional strain on the work during the tooling thereof.

Another object of the invention is the provision of a machine tool including an improved double end drive in which the driving torque is equally distributed between the said driving ends.

A further object of the invention is the provision of a mechanism for use with grinding machines and the like for rotating work pieces from opposite ends in which a substantially equal driving torque is applied at the said ends and in which said driving means are so coupled that an increase of the driving torque at one end will correspondingly increase the driving torque at the other end thereby properly rotating the work.

A still further object of the invention is the provision of a double end driving mechanism for grinding machines, lathes and similar machine tools in which the driving means are so connected as to distribute the driving torque in accordance with the work to be done by each.

Other objects and advantages of the present invention should be readily apparent by reference to the following specification considered in conjunction with the accompanying drawings, forming a part thereof, and it is to be understood that any modifications may be made in the exact structural details there shown and described within the scope of the appended claims without departing from or exceeding the spirit of the invention.

In the drawings:

Figure 3 is a diagrammatic view of the wiring diagram involved in the invention, shown in Figures 1 and 2.

Figure 4 is a fragmentary top plan view of the machine shown in Figure 1, illustrating a modification of the invention.

Figure 6 is a wiring diagram of the invention as disclosed in Figures 4 and 5.

Throughout the several views of the drawings similar reference characters are employed to denote the same or similar parts.

Figure 1:
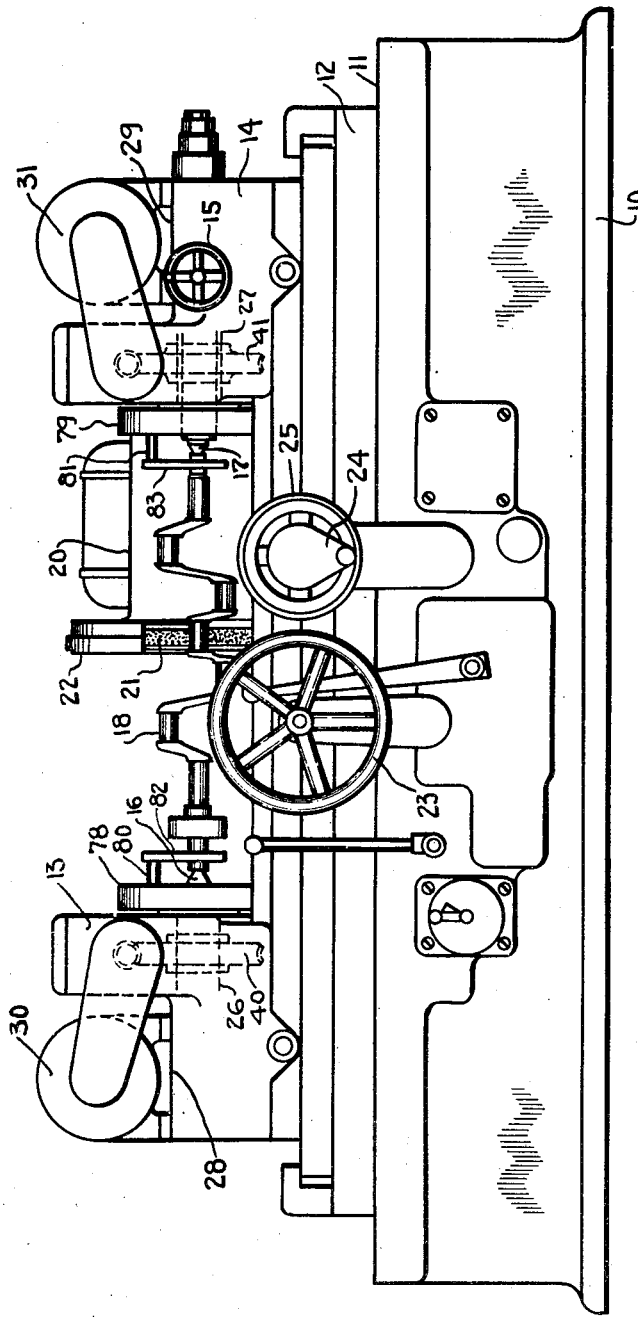
Figure 1 is a front elevation of a grinding machine embodying the improvements of this invention.
Figure 2:
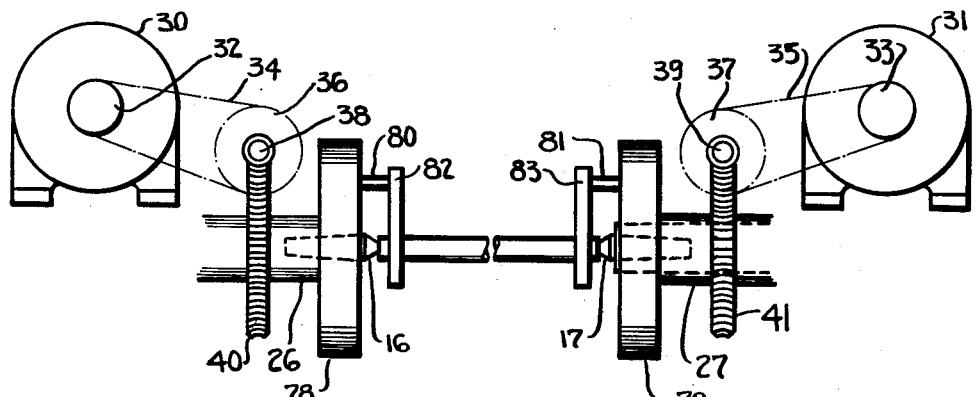
Figure 2 is a semi-diagrammatic view illustrating the invention.

Difficulty has frequently been experienced in properly rotating relatively long slender work pieces to reduce the twisting thereof during the tooling operation, this twisting or torsional strain being caused by the tool contacting the piece during the tooling operation thereby causing one end to lag behind the driven end so that a twist resulted in the work. Attempts have been made to drive the work from opposite ends in an endeavor to overcome this twisting in the work, but these drives have been mechanically interlocked and included inherent weaknesses and did not completely overcome the difficulty. Attempts have also been made to hydraulically drive the work from opposite ends, but the mechanism involved was too complicated and costly to be practical in the solving of the problem. By the invention disclosed in the drawings and to be described in detail, these difficulties have been effectively overcome in an expeditious and relatively inexpensive manner.

For purposes of illustration there is disclosed in the drawings a crank shaft as commonly employed with internal combustion engines and the like as the work piece to be driven and operated upon. It is to be understood that the invention has equal application to machines other than the grinding machine illustrated.

Accordingly, the numeral 10 designates the bed of a grinding machine having formed on the upper surface thereof suitable guideways 11 for guiding a work supporting table 12 in its travels relative to the bed 10. The work supporting table 12 has secured to its upper surface self-contained head stock 13 and self-contained tail stock 14 similar in all respects except that the spindle of the tail stock 14 is retractible as by means of the hand wheel 15 to permit the insertion of a work piece between them. The head stock 13 has projecting from it a center 16 while the tail stock 14 has projecting from it a similar center 17 between which centers the work piece 18 is disposed during the tooling operation. The bed 10 is provided with a rearwardly projecting extension 19 forming guideways for a carriage or the like 20 in which is rotatably mounted, as is usual practice, a spindle carrying on its end a grinding wheel 21. The grinding wheel 21 is enclosed within a suitable guard or the like 22 for confining the coolant usual with grinding machines.

The work table 12 is adapted to be translated relative to the bed 10 for aligning the different bearing portions of the work piece 18 with the grinding wheel 21 wherefor suitable mechanism is supported by the bed 10 and operated by the hand wheel 23. Either the grinding wheel or the work is fed toward the other to effect the stock removal from the work being ground for which purpose the bed carries suitable mechanism operable by the hand wheel 24 or by the power ratchet 25.

The work centers 16 and 17 are respectively mounted in head stock spindle 26 and tail stock spindle 27 respectively journaled in the head and tail stock housings. Each of these housings have their upper surfaces flattened, respectively indicated at 28 and 29 to which is respectively secured a prime mover or electrical motor 30 and 31. The shaft of each motor is provided with a pinion 32 and 33 about which is trained a sprocket chain 34 and 35 respectively trained about sprocket gears 36 and 37. The sprocket gears 36 and 37 are each secured to a worm shaft carrying a driving worm 38 and 39 respectively in mesh with worm wheels 40 and 41 respectively secured to the head stock spindle 26 and tail stock spindle 27.

From the foregoing it will be noted that the said spindles are rotated individually by their individual prime movers or motors for individually rotating their adjacent end of the work. As shown in Figure 3, the armatures 84 and 85 respectively of the motors 30 and 31 are connected in series as by the electrical lead 42 while the other side of the armature of motor 30 is connected by a wire 43 with the positive lead 44 and the other side of the armature of the motor 31 is connected by an electrical lead 45 with the main negative lead 46. Extending from the main positive lead 44 is a wire 47 connected by a movable arm 48 to a rheostat or speed controller 49 which has its one end connected by a wire 50 to the fields 51 and 52 respectively of the motors 30 and 31. The fields of these motors are illustrated in Figure 3 by the reference characters 51 and 52, being connected in series by the electric wire 53 while the field 52 is connected at its other end by a wire 54 with the negative lead 46. The head and tail stock spindles have respectively secured to their forward ends face plates 78 and 79 from which project driving pins 80 and 81 respectively engaging driving dogs 82 and 83 which are secured to each end of the work piece.

The fundamental equation of torque of a direct current motor is:

$$T = K\phi I_a$$

in which $T$ = the total torque of the motor $\phi$ = the flux per pole $I_a$ = the armature current and $K$ = the constant of the motor, which depends on the number of conductors, number of poles, paths in the armature, length of pole face, etc.

The fundamental speed equation of the motor is:

$$E_a = K\phi n$$

in which $E_a$ = the counter-electro motive force of the armature, $K$ = the constant of the motor, $\phi$ = the flux per pole and $n$ = the speed of the motor.

The fundamental voltage equation for the direct current shunt wound motor is:

$$E_t = E_a + I_a R_a$$

where $E_t$ = external voltage $E_a$ = back electro motive force or voltage being produced in armature by reason of conductors cutting the field. This voltage opposes the external voltages. $I_a$ = the armature current and $R_a$ = armature resistance.

From the foregoing the equation of a two motor hook up, as shown for example in Figure 3, would be for torque:

$$T = K\phi I_a \text{ for either motor.}$$

Since $I_a$ must be equal for both motors, the torque $T$ must also be equal for both.

The voltage equation for the two motors therefore is:

$$E_t = E_{1a} + E_{2a} + 2I_a R_a$$

With an increase in $I_a$ due to an increase in $T$ in either motor there would be an increase in $I_a R_a$. This causes the back electro motive force to drop since $E_t$ is constant. If the back electro motive force in both motors drops, then from the equation $$E_a = K\phi n$$

it is shown that $n$ must drop. The second motor will run ahead until it takes its share of the torque and thereby balance the torque between the motors to drive the work at a speed in which the torsional strain on the work is reduced to approximately one-half of what it would be during the grinding or tooling operation if but a single drive were employed.

The foregoing description deals with equal driving torques at each end of a work piece which under most conditions will be sufficient for effecting the proper rotation of the work without undue twisting thereof or throwing undue strain on either of the driving ends.

Figure 5:
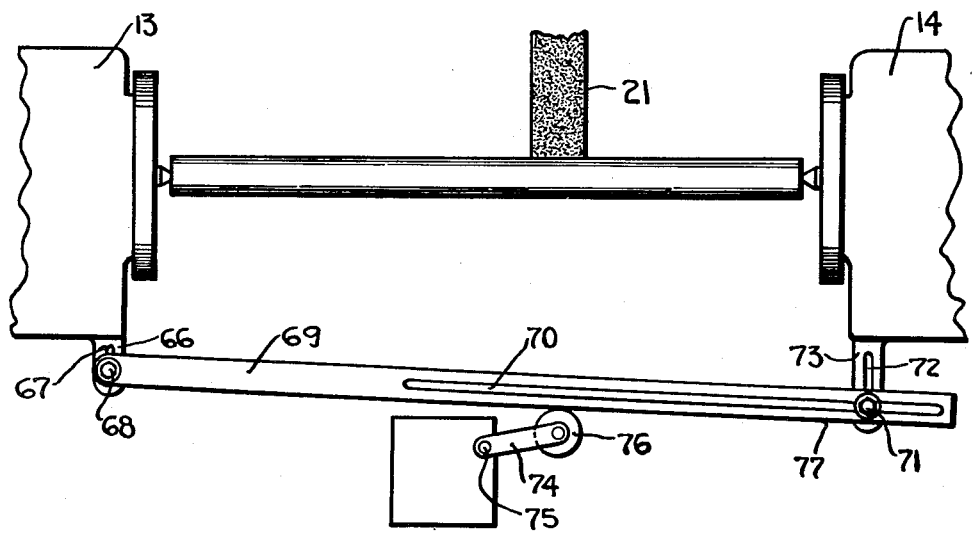
Figure 5 is a semi-diagrammatic view illustrating the invention disclosed in Figure 4.

In the modification illustrated in Figures 4, 5 and 6, an arrangement is shown whereby the torque on the motors 30 and 31 varies in accordance with the position of the work and the tool so that when the tool is nearer one end of the work than the other that motor is made to deliver the greater torque, but the sum of the driving torque delivered by the two motors is equal to the total driving torque required. As shown in Figure 6, this is amply taken care of by connecting the field 51 of the motor 30 by an electric wire 55 with a resistance 56 instead of with the rheostat or speed controller 49. The other end of the field 51 would then be connected by an electric wire 57 to the main negative lead 46 instead of with the field 52 of the motor 31. The field 52 of the motor 31 would be connected as by an electric wire 58 with a resistance 59 at one end, having its other end connected by an electric wire 60 to the negative lead 46. A conductor arm 61 is provided having contacts 62 and 63 at its opposite ends for respectively contacting with the resistances 56 and 59 and being oscillated about a central pivot or axis 64. The conductor arm 61 would be connected by a wire 65 with the end of the rheostat or speed controller 49 that is in turn connected by the wire 47 and movable arm 48 with the positive lead 44, as above described.

From this it will be seen that an increase in the resistance 56 will simultaneously and correspondingly decrease the resistance in 59 so that the field current in 51 will be decreased while that in 52 will be increased. Thus the flux per pole of the motor 30 will decrease as the flux per pole of the motor 31 increases and thereby vary the driving torque of said motor in accordance with the work to be performed by each motor.

The changing or varying of the torque on each motor may conveniently be a function of the work table movement, which is shown in the drawings. As there shown, the head stock 13 has projecting from it an ear or lug 66 having an elongated perforation 67 therein receiving a bolt or the like 68 acting as a pivot and employed for securing one end of an elongated bar 69 to the lug 66. This bar 69 should have an effective length at least equal to the length of the work being ground and may conveniently have an elongated perforation 70 formed therein through which a clamping and pivot bolt 71 passes. This bolt 71 also extends through an elongated perforation 72 formed in a lug or ear 73 extending from the tail stock 14.

As shown in Figures 4 and 5, the bar 69 extends at an angle to the axis of the work for oscillating an arm 74 about the axis of a shaft 75 secured to one end thereof. The other end of the arm has pivoted thereto a roller 76 contacting with the operative or cam face 77 of the bar 69. The shaft 75 is the pivot 64 for the arm 61 so that as the arm 74 is oscillated the bar 69 is likewise oscillated for varying the effectiveness of resistances 56 and 59, as above explained. From this it will be seen that the arm 61 is automatically shifted for automatically varying the effectiveness of resistances 56 and 59 so that the driving torque delivered by the motors 30 and 31 as illustrated in Figures 4 to 6, inclusive, is automatically varied in accordance with the driving torque requirements at each end of the work.

From the foregoing it will be seen that there has been provided a driving mechanism for work pieces whereby the work is absolutely and effectively rotated about a definite axis and at the same time substantially reducing the torsional strain on the work during the tooling operation. It should also be readily appreciated that the invention has equal application to other types of machine tools than the grinding machine illustrated in the drawings, such as lathes and the like.

What is claimed is:

1. In a machine tool organization the combination of a bed, a tool mounted thereon, means for supporting a work piece adjacent the tool, and means operable from each end of the work for rotating same and adapted to automatically exert an equal driving torque while rotating the work, said driving means at each end of the work comprising an electrical motor, and means for electrically interconnecting said motors for balancing the driving torque thereof.

2. In a machine tool organization the combination of a bed, work supports mounted thereon and terminally engaging the work, a driving mechanism at each end of the work and connected with the terminals thereof for simultaneously rotating the work, each driving mechanism including an electrical motor, means for traversing the work relative to the tool, and means for automatically varying the division of driving torque between the motors in accordance with the position of the tool relative to the terminals of the work.

3. In a machine tool organization the combination of a bed, a tool mounted thereon, work supports supporting a work piece adjacent the operative portion of the tool, and means connectible with the ends of the work for rotating it about a predetermined axis and with a balanced driving torque, including an electrical motor for each end of the work, means for electrically connecting the armatures of the motors in series with a single source of energy, and means for electrically connecting the fields of said motors in series with said source of energy whereby variation in driving torque in one of the motors automatically varies the driving torque in the other.

4. In a machine tool organization the combination of a bed, a tool mounted thereon, work supports supporting a work piece adjacent the operative portion of the tool, and means connectible with the ends of the work for rotating it about a predetermined axis and with a balanced driving torque, including an electrical motor for each end of the work, means for electrically connecting the armatures of the motors in series with a single source of energy, means for electrically connecting the fields of said motors in series with said source of energy whereby variation in driving torque in one of the motors automatically varies the driving torque in the other, and electrical control means in series with the fields of the motors for simultaneously varying the speeds thereof.

5. In a double end work drive for use with machine tools the combination of means terminally engaging the work for supporting same for rotation about a predetermined axis, a driving mechanism connected with each end of the work and each including an electrical motor, means connecting the armatures of said motors to a single source of energy, and means for connecting the fields of said motors to said single source of energy whereby variation in driving torque of one motor automatically varies the driving torque in the other motor for thereby balancing the driving torque of the two motors.

6. In a double end work drive for use with machine tools the combination of means terminally engaging the work for supporting same for rotation about a predetermined axis, a driving mechanism connected with each end of the work and each including an electrical motor, means connecting the armatures of said motors to a single source of energy, means for connecting the fields of said motors to said single source of energy whereby variation in driving torque of one motor automatically varies the driving torque in the other motor for thereby balancing the driving torque of the two motors, and means between the motors and the source of electrical energy for automatically simultaneously varying the speeds of the motors.

7. In a double end drive for machine tools the combination of a bed, a work support movable relative to the bed, a tool mounted on the bed for operation on the work during its traverse relative to the bed, a driving mechanism connected with each end of the work and each mechanism including an electrical motor adapted to produce substantially equal driving torques and adapted to have the driving torque apportioned between them in a predetermined relationship, and means for automatically varying the apportionment of the driving torque between the motors.

8. In a double end drive for machine tools the combination of a bed, a work support movable relative to the bed, a tool mounted on the bed for operation on the work during its traverse relative to the bed, a driving mechanism connected with each end of the work and each mechanism including an electrical motor adapted to produce substantially equal driving torques and adapted to have the driving torque apportioned between them in a predetermined relationship, and means automatically varying the apportionment of the driving torque between the motors, said means comprising an electrical resistance between a source of electrical energy and each motor, said resistances being equal when the driving torque is equally apportioned between the motors and complements of one another when the torque is unequally apportioned between them, and means for automatically varying the effectiveness of said resistances to thereby automatically vary the apportionment of the driving torque between the motors.

9. In a double end drive for machine tools the combination of a bed, a work support movable relative to the bed, a tool mounted on the bed for operation on the work during its traverse relative to the bed, a driving mechanism connected with each end of the work and each mechanism including an electrical motor adapted to produce substantially equal driving torques and adapted to have the driving torque apportioned between them in a predetermined relationship, and means automatically varying the apportionment of the driving torque between the motors, said means comprising an electrical resistance between a source of electrical energy and each motor, said resistances being equal when the driving torque is equally apportioned between the motors and complements of one another when the torque is unequally apportioned between them, means for automatically varying the effectiveness of said resistances to thereby automatically vary the apportionment of the driving torque between the motors, and means between the work support and resistance varying means whereby movement of the work determines the effectiveness of the resistances.

ALBERT H. DALL.
HANS ERNST.